United States Patent
Yajima et al.

(10) Patent No.: US 7,861,183 B2
(45) Date of Patent: Dec. 28, 2010

(54) GUIDANCE DISPLAY DEVICE

(75) Inventors: Hideaki Yajima, Osaka (JP); Keisuke Nishie, Kanagawa (JP)

(73) Assignee: Panasonic Corporation, Osaka (JP)

( * ) Notice: Subject to any disclaimer, the term of this patent is extended or adjusted under 35 U.S.C. 154(b) by 94 days.

(21) Appl. No.: 10/593,724

(22) PCT Filed: Jul. 11, 2005

(86) PCT No.: PCT/JP2005/012773

§ 371 (c)(1),
(2), (4) Date: Sep. 21, 2006

(87) PCT Pub. No.: WO2006/009001

PCT Pub. Date: Jan. 26, 2006

(65) Prior Publication Data

US 2008/0052622 A1    Feb. 28, 2008

(30) Foreign Application Priority Data

Jul. 20, 2004    (JP) ............................. 2004-211301

(51) Int. Cl.
*G06F 3/048* (2006.01)
(52) U.S. Cl. ...................... 715/789; 715/804
(58) Field of Classification Search ............ 715/712, 715/789, 804
See application file for complete search history.

(56) References Cited

U.S. PATENT DOCUMENTS

| | | | |
|---|---|---|---|
| 5,687,313 A | 11/1997 | Hirosawa et al. | |
| 5,889,493 A * | 3/1999 | Endo | 342/357.08 |
| 5,987,234 A | 11/1999 | Hirosawa et al. | |
| 6,515,595 B1 * | 2/2003 | Obradovich et al. | 340/905 |
| 6,741,790 B1 * | 5/2004 | Burgess | 386/46 |
| 6,782,383 B2 * | 8/2004 | Subramaniam et al. | 707/3 |
| 6,829,615 B2 * | 12/2004 | Schirmer et al. | 707/102 |
| 6,892,135 B1 * | 5/2005 | Krull et al. | 701/211 |
| 6,950,990 B2 * | 9/2005 | Rajarajan et al. | 715/736 |
| 7,076,453 B2 * | 7/2006 | Jammes et al. | 705/26 |

(Continued)

FOREIGN PATENT DOCUMENTS

JP    05-073274    3/1993

(Continued)

OTHER PUBLICATIONS

Ray, Jay, Mac OS X Unleashed, Nov. 2001, Sams, Chapter 4. The Finder: Working with Files and Applications (p. 1-15).*

(Continued)

*Primary Examiner*—William L Bashore
*Assistant Examiner*—David Phantana-angkool
(74) *Attorney, Agent, or Firm*—Wenderoth, Lind & Ponack, L.L.P.

(57) ABSTRACT

A guidance display device that displays appropriate guidance for a screen, wherein the screen includes display regions. Specifically a guidance display region for guiding a user's operation includes: guidance content holding units which previously hold guidance display contents respectively corresponding to display regions to be operated by the user and are included in one screen; a guidance synthesis unit which obtains the guidance display contents respectively corresponding to the display regions from the guidance content holding units, and synthesizes the obtained guidance display contents into one; and a guidance display unit which displays the guidance display contents synthesized by the guidance synthesis unit on the screen.

7 Claims, 13 Drawing Sheets

U.S. PATENT DOCUMENTS

| | | | |
|---|---|---|---|
| 7,082,571 B2 * | 7/2006 | Ikeda | 715/712 |
| 2004/0230914 A1 * | 11/2004 | Arend et al. | 715/804 |
| 2005/0131959 A1 * | 6/2005 | Thorman et al. | 707/200 |
| 2006/0200443 A1 * | 9/2006 | Kahn et al. | 707/1 |

FOREIGN PATENT DOCUMENTS

| | | |
|---|---|---|
| JP | 9-149129 | 6/1997 |
| JP | 10-097402 | 4/1998 |
| JP | 2000-091940 | 3/2000 |
| JP | 2001-016314 | 1/2001 |
| JP | 2001-134366 | 5/2001 |

OTHER PUBLICATIONS

FOMA P2102V, Basic Manual, p. 1-1 to 1-14, Apr. 2003, NTT DoCoMo (with partial English translation).

"K-tai (Mobile) New Products SHOW CASE, P506iC Black Tornado", p. 1-10, Jul. 20, 2004, ImpressWatch Corporation (with partial English translation).

* cited by examiner

FIG. 5

Guidance contents of each display region

| Item | 101 | | 102 | |
|---|---|---|---|---|
| | Display state | Display content | Display state | Display content |
| Upward arrow | Display | | — | |
| Rightward arrow | — | | — | |
| Downward arrow | Display | | — | |
| Leftward arrow | — | — | — | |
| Soft key | — | — | Display | Playback |
| State display | — | — | Display | Stop |
| Operation guide | — | — | — | — |

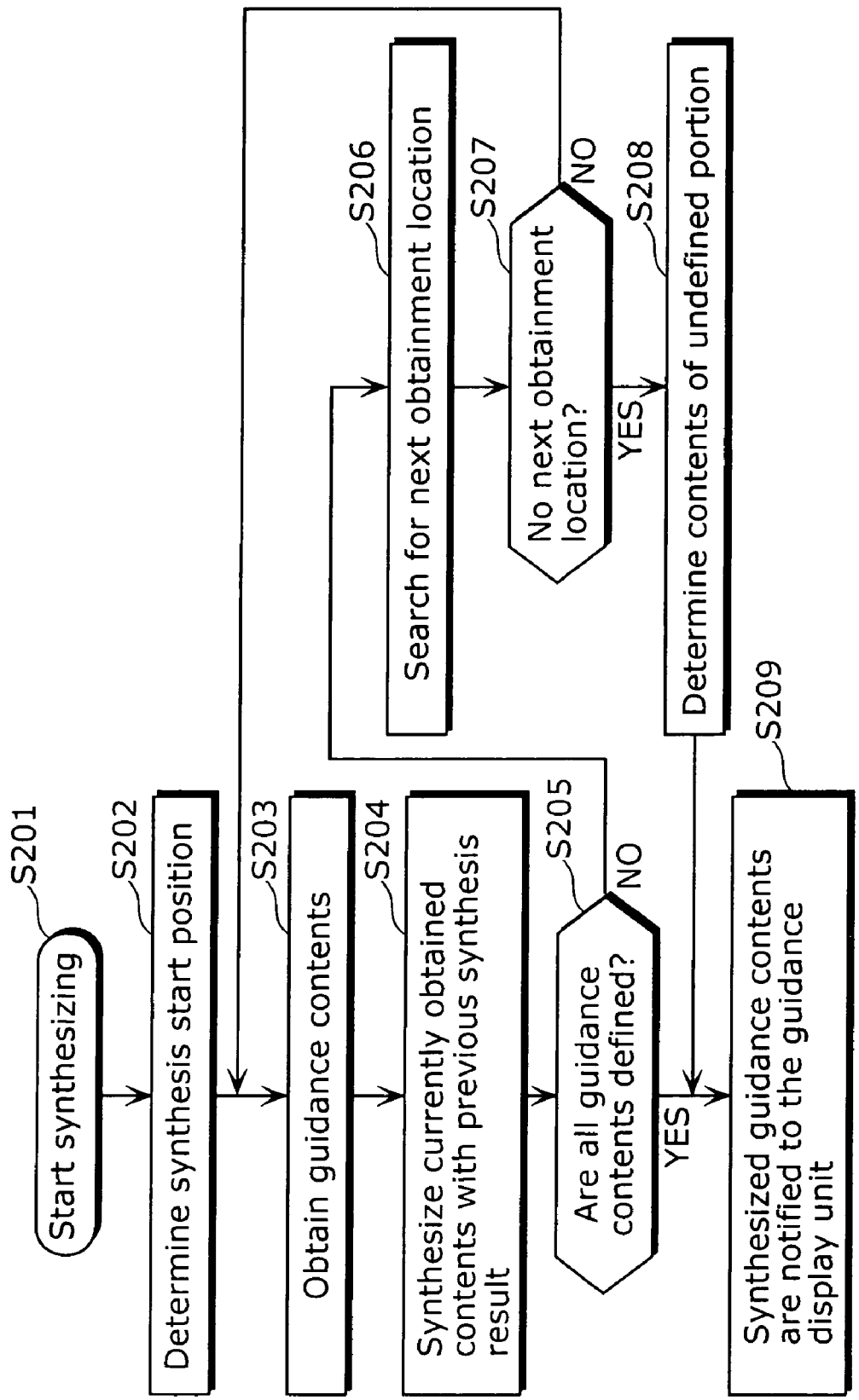

FIG. 7

| Item | Previous synthesis result (101) | | Obtained result (102) | | Synthesis result | |
|---|---|---|---|---|---|---|
| | Display state | Display content | Display state | Display content | Display state | Display content |
| Upward arrow | — | / | Display | / | Display | / |
| Rightward arrow | — | / | — | / | — | / |
| Downward arrow | — | / | Display | / | Display | / |
| Leftward arrow | — | / | — | / | — | / |
| Soft key | Display | Playback | — | — | Display | Playback |
| State display | Display | Stop | — | — | Display | Stop |
| Operation guide | — | — | — | — | — | — |

FIG. 10

| Item | Use state | Display position (vertical/horizontal) | Display size (width/height) |
|---|---|---|---|
| Upward arrow | Display | (50,0) | (10,10) |
| Rightward arrow | Display | (60,10) | (10,10) |
| Downward arrow | Display | (50,20) | (10,10) |
| Leftward arrow | Display | (40,10) | (10,10) |
| Soft key | Display | (100,0) | (40,30) |
| State display | Display | (150,0) | (40,30) |
| Operation guide | No-display | (0,0) | |

FIG. 11

Guidance contents of each display region

| Item | 801 | | 802 | | 804 | | 805 | |
|---|---|---|---|---|---|---|---|---|
| | Display state | Display content | Display state | Display content | Display state | Display content | Display state | Display content |
| Upward arrow | Display | | — | | Display | | — | |
| Rightward arrow | — | | — | | — | | Display | |
| Downward arrow | Display | | — | | Display | | — | |
| Leftward arrow | — | | — | | — | | Display | |
| Soft key | — | | Display | Playback | — | | — | |
| State display | — | | Display | Stop | — | | — | |
| Operation guide | — | | — | | — | | — | |

FIG. 12

In the case where 802 is operated

| Item | Previous synthesis result (802) | | Obtained result (805) | | Synthesis result | |
|---|---|---|---|---|---|---|
| | Display state | Display content | Display state | Display content | Display state | Display content |
| Upward arrow | — | \ | — | \ | — | \ |
| Rightward arrow | — | \ | Display | \ | Display | \ |
| Downward arrow | — | \ | — | \ | — | \ |
| Leftward arrow | — | \ | Display | \ | Display | \ |
| Soft key | Display | Playback | — | — | Display | Playback |
| State display | Display | Stop | — | — | Display | Stop |
| Operation guide | — | — | — | — | — | — |

FIG. 13

In the case where 804 is operated

| Item | Previous synthesis result (804) | | Obtained result(805) | | | Synthesis result | |
|---|---|---|---|---|---|---|---|
| | Display state | Display content | Display state | Display content | | Display state | Display content |
| Upward arrow | Display | | — | | | Display | |
| Rightward arrow | — | | Display | | | Display | |
| Downward arrow | Display | | — | | | Display | |
| Leftward arrow | — | | Display | | | Display | |
| Soft key | — | — | — | — | | — | — |
| State display | — | — | — | — | | — | — |
| Operation guide | — | — | — | — | | — | — |

GUIDANCE DISPLAY DEVICE

TECHNICAL FIELD OF THE INVENTION

The present invention relates to a guidance display device and a guidance display method for guiding a user's operation on a screen-by-screen basis, particularly to a technology for displaying guidance in the case where one screen includes plural display regions to be operated by the user.

BACKGROUND OF THE INVENTION

A personal computer (hereinafter also referred to as PC) uses a larger display component than a mobile information terminal such as a cellular phone. Therefore, there has been a case where plural applications share one screen. The display regions of respective applications are included in one screen and guidance is displayed for each display region.

On the other hand, the screen of a display component (such as a Liquid Crystal Display (LCD)) of the mobile information terminal is smaller in size and lower in resolution with the conventional technology so that guidance display is performed with one application occupying the entire screen. However, recent advances in the enlargement of the screen size and increase of the screen resolution have allowed plural applications to share one screen. In this case, it is desired also in the mobile information terminal to include display regions of respective applications in one screen and to display guidance for each display region. The screen size of the mobile information terminal, however, cannot be enlarged as in the case of the PC. Consequently, the guidance has been displayed in a very limited space.

A guidance display device which displays guidance of operations in a conventional information processing terminal such as a cellular phone adopts a method of determining soft key display contents and displaying the determined contents on a screen using a calling state function priority table showing priorities of displaying functions to be displayed for respective calling states of the cellular phone and a soft key function priority table showing functions with respective priorities to be assigned to respective soft keys (e.g. refer to Patent Reference 1). A function which varies depending on a state can be assigned to one soft key, as an operation action taken when the soft key is pressed. In the cellular phone disclosed in the Patent Reference 1, functions are assigned to four soft keys. The positions in which guidance corresponding to the assigned functions are displayed are then determined and the guidance is displayed at the determined positions.

Furthermore, another conventional guidance display device adopts a method with which a control unit, which manages a current state of a cellular phone and a valid key, obtains guidance information relating to the current state of the valid key from a guidance database, copies a layout of the key and displays the guidance information (e.g. refer to Patent Reference 2). The conventional guidance display device disclosed in the Patent Reference 2 judges whether or not a guidance display is necessary based on an internal state of the terminal, obtains the guidance information corresponding to the current state from an operation guidance information database, displays the obtained guidance information, and judges whether or not a key operation is a valid input when the key is operated.

Furthermore, other conventional guidance display device adopts a method of displaying, from among guidance display contents for each window, guidance display contents corresponding to an active window (e.g. refer to Patent Reference 3). The conventional guidance display method disclosed in the Patent Reference 3 displays, from among the guidance contents for respective sets of windows, guidance contents corresponding to an active window which receives a keyboard input.

Patent Reference 1: Japanese Laid-Open Patent Application No. 9-149129
Patent Reference 2: Japanese Laid-Open Patent Application No. 2000-91940
Patent Reference 3: Japanese Laid-Open Patent Application No. 10-97402

However, it is necessary for the aforementioned conventional technologies to determine, at the system design level, guidance display contents corresponding to respective states of the system in accordance with a screen layout and an operation specification.

Accordingly, the following problems are raised in the case where one screen is made up of plural display regions. It should be noted that "one screen" indicates not a display component (a display) such as a LCD and a liquid crystal of an information processing terminal such as a cellular phone, but contents to be displayed on a display of a device.

For example, the one screen is made up of one or more display regions (700, 701, 702 and 703) as shown in FIG. 1. The display regions to be operated by a user are the display region 701 shown in FIG. 1A and the display region 702 shown in FIG. 1B. The screen shown in FIG. 1C is generated by superimposing the display region 702 on the display region 701.

Conventionally, it is necessary to generate guidance for the display region 701 shown in FIG. 1A and guidance for the display region 701 shown in FIG. 1B at the system design level.

The first problem is that an appropriate displaying of guidance on the screen cannot be performed if there is even a portion of the display regions on the screen where an operation specification, display contents and the like relating to the displaying of guidance is not clear in advance.

For example, on the screen as shown in FIG. 1, an appropriate displaying of guidance cannot be performed if the display contents and the operation specification of the display region 702 are not clear even if the display contents and operation specifications of other display regions 700 and 701 have been known. Specifically, FIG. 1 shows a screen on which contents of image data made up of four display regions 700 to 703 are browsed and up-and-down keys are used for an operation of switching image data (such as data 1 and data 2) to be browsed. The application for actually displaying image data can be freely replaced by downloading and the like. The display contents of the downloaded application are then displayed in the display region 702, and guidance of an entire screen is displayed in the display region 703.

The guidance display of the upward and downward arrows indicating valid and invalid of the up-and-down keys used for data switching can be previously set. However, the guidance of a key used for operation of the downloaded application and the guidance indicating a state of the downloaded application is not clear until the application is downloaded so that they cannot be determined at the system design level.

For example, the application having a playback function displays a "playback" as key operation guidance as shown in FIG. 1, and the application having an editing function displays an "editing" in this case. Further, in the case where the application does not receive any key operations, there is a possibility that nothing is displayed.

Similarly, with respect to the guidance indicating a state of an application, the application having a playback function displays the states such as "playback" and "stop". Also, there is a possibility that the application which requires time for playback displays "in preparation" and the like.

As described above, the guidance display contents on the entire screen vary depending on a specification of the application to be downloaded so that the conventional technology which requires to predetermine the guidance display contents cannot perform appropriate displaying of guidance.

The second problem is that, for example, in the case where the layout of the display regions on the screen is changed as shown in FIG. 2 due to a customization and a change of display size by the user, a displaying of guidance appropriate to the changed layout cannot be performed.

Specifically, as shown in FIG. 2, the pre-change layout screen includes four display regions 800 to 803, in which the display region 802 is included in the display region 801. The post-change layout screen newly adds the display regions 804 and 805, in which the display region 802 is no longer included in the display region 802 and the display regions 802, 803 and 804 are arranged in parallel on the display region 805. Also, the contents of the guidance to be displayed on respective display regions are predetermined. The display region 801 displays upward-and-downward arrows indicating valid and invalid of the up-and-down keys used for data switching operation. The display region 802 displays "playback" indicating that display data has been played back by a soft key and "stop" indicating a state where the playback has been stopped. The display region 804 displays upward-and-downward arrows indicating valid and invalid of the up-and-down keys used for group switching operation. The display region 805 displays rightward-and-leftward arrows indicating valid and invalid of the right-and-left keys used for selecting a display region to be operated from among the display regions 801, 802 and 804.

In such case, in the pre-change layout screen, the display regions which require guidance are only the display regions 801 and 802 having the inclusion relation. In the case where the display region 802 is to be operated, the appropriate guidance to be displayed on the entire screen is contents combining the display of upward-and-downward arrows in the display region 801 and the display of "playback" and "stop" in the display region 802 as shown in FIG. 2. On the other hand, in the post-change layout screen, the display region 802 is included in the display region 805 so that the appropriate guidance to be displayed on the entire screen, in the case where the display region 802 is to be operated, is contents combining the rightward, leftward, upward and downward arrows in the display region 805 and the display of "playback" and "stop" in the display region 802. In addition, since the display regions 801, 802 and 804 are arranged in parallel on the post-change layout screen, the display regions to be operated are changed. In the case where the operation targets are changed to the display regions 801 and 804, it is necessary to respectively display, as the guidance of the entire screen, contents combining the guidance displays of the display regions 801 and 805 and the display regions 804 and 805. Accordingly, even if the contents to be displayed as guidance on each display region are previously known, the displaying of guidance on the entire screen varies depending on a layout of each display region. Therefore, in the case where the post-change layout is not previously known, an appropriate displaying of guidance cannot be performed with the conventional technology.

In order to overcome the conventional problems, an object of the present invention is to provide a guidance display device which can appropriately display guidance display contents corresponding to changes of screen display contents, layout, operation specification and the like.

SUMMARY OF THE INVENTION

In order to overcome the aforementioned object, a guidance display device according to the present invention is a guidance display device for guiding a user's operation, the guidance display device including: a guidance content holding unit which holds, in advance, guidance display contents respectively corresponding to display regions which are included in one screen and are to be operated by the user; a guidance synthesis unit which obtains, from the guidance content holding unit, the guidance display contents respectively corresponding to the display regions, and to synthesize the obtained guidance display contents into one; and a guidance display unit which displays, on the screen, the guidance display contents synthesized by the guidance synthesis unit.

Accordingly, the guidance display contents can be appropriately combined and easily synthesized in accordance with a screen layout and an operation state without changing the guidance display contents stored in the guidance content holding unit. Also, even in the case where the display regions having the display contents and operation specification are integrated on the screen or where unnecessary display regions are deleted from the screen, an appropriate displaying of guidance can be realized by adding or deleting guidance content holding units corresponding to the display regions without changing the guidance display contents relating to other display regions.

It should be noted that the present invention can be realized not only as such guidance display device, but also as a guidance display method having characteristic units included in the guidance display device as steps, as a program causing a computer to execute those steps, and as an LSI which integrates the characteristic units included in the guidance display device. Also, it is obvious that such program can be distributed via a recording medium such as a CD-ROM and a transmission medium such as the Internet.

As is obvious from the aforementioned explanation, the guidance display device of the present invention can perform appropriate displaying of guidance through synthesizing based on information relating to the guidance displays of respective regions on a screen. Therefore, the guidance can be displayed even in the case, for example, where an application displayed in a portion of the screen is changed by downloading another application, or where the display contents and operation specification of only a portion of display regions on the screen are changed by a user's customization.

Further, an appropriate displaying of guidance can be realized even in the case where a layout on the screen is dynamically changed in accordance with a screen size and a direction of the screen.

Furthermore, an appropriate displaying of guidance is automatically performed by setting only the guidance display contents for the respective display regions without taking the operation state, layout and the like into consideration. Therefore, the development of software for performing guidance display becomes easier and a memory to be used can be saved since there is no need of holding guidance information for each operation state and layout.

Accordingly, the present invention can perform simple and appropriate guidance display by obtaining the guidance display contents respectively corresponding to the display regions from the guidance content holding unit and by synthesizing the obtained guidance display contents into one. Therefore, a practical value of the present invention is very high in today's expansion of use of mobile information terminals such as a cellular phone.

BRIEF DESCRIPTION OF DRAWINGS

FIG. 5 is a diagram showing an example of guidance contents according to the first embodiment of the present invention.

FIG. 6 is a flowchart showing a guidance synthesizing processing according to the first embodiment of the present invention.

FIG. 7 is a diagram showing an example of a guidance synthesis result according to the first embodiment of the present invention.

FIG. 10 is a diagram showing an example of holding information of a guidance display position management unit according to the second embodiment of the present invention.

FIG. 11 is a diagram showing an example of guidance contents according to the second embodiment of the present invention.

FIG. 12 is a diagram showing an example of a guidance synthesis result according to the second embodiment of the present invention.

FIG. 13 is a diagram showing another example of the guidance synthesis result according to the second embodiment of the present invention.

Figure 1A:
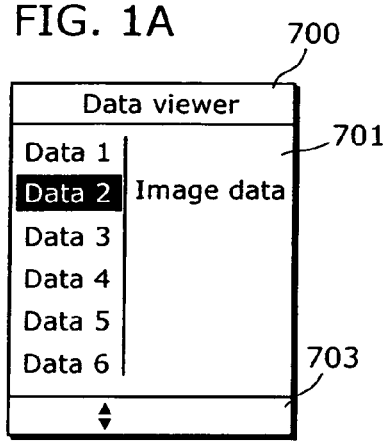
FIG. 1 is a diagram showing an example of a screen display including plural display regions.

NUMERICAL REFERENCE 21, 22 Guidance display device
100~103, 700~703, and 800~805 Display region
104~107 Guidance content holding unit
108 Region independent guidance content holding unit
109 Guidance synthesis unit
109a Determination unit
110 Guidance display unit
501 Arrangement relation management unit
502 Guidance display position management unit

DETAILED DESCRIPTION OF THE INVENTION

Embodiments of the present invention are described in detail with reference to drawings hereinafter.

First Embodiment

Figure 3:
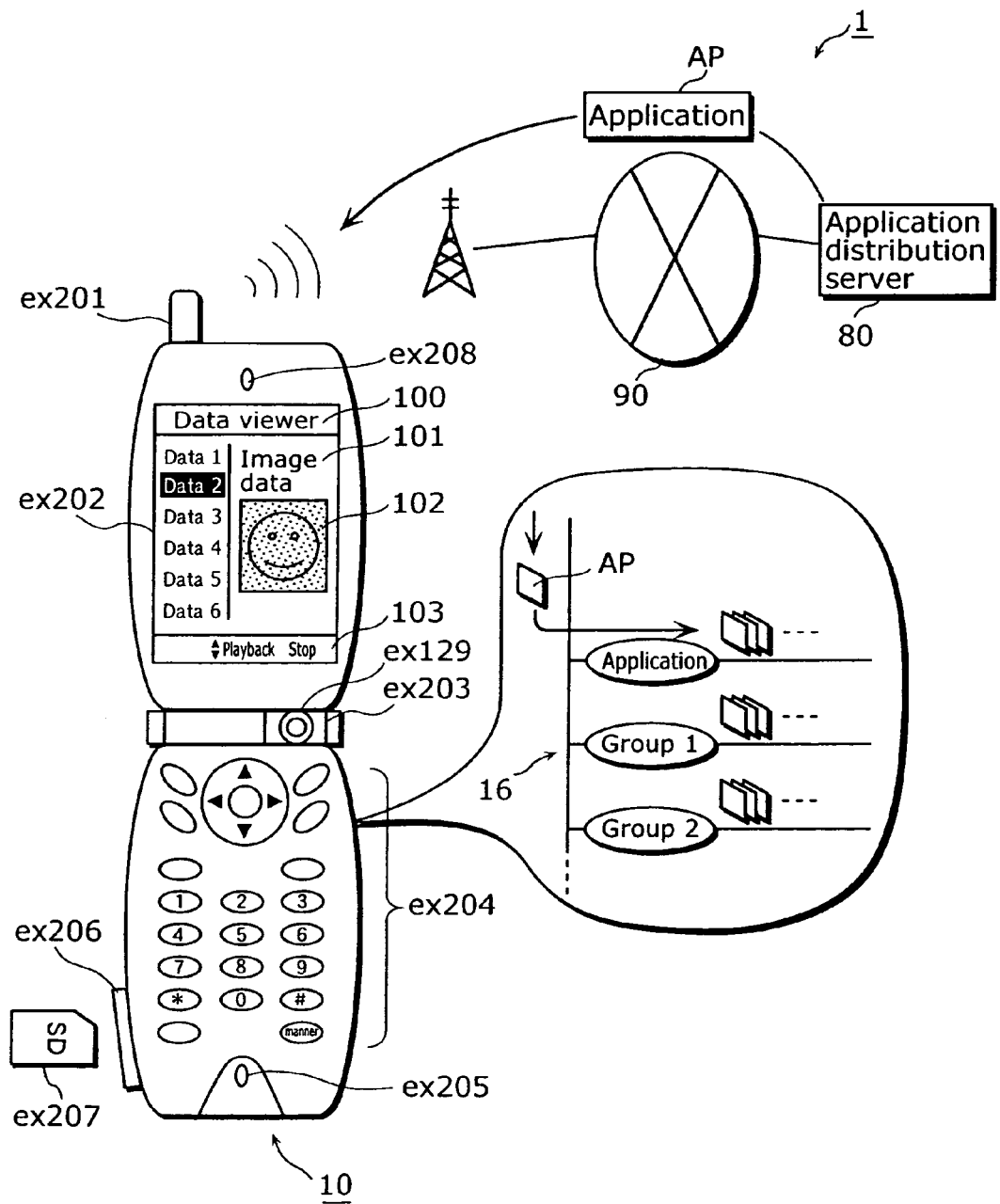
FIG. 3 is a diagram showing an overall structure of a communication system to which a guidance display device according to the first embodiment of the present invention is adopted.

FIG. 3 is a diagram showing an overall structure of a communication system 1 to which a guidance display device according to the first embodiment of the present invention is adopted.

The communication system 1 is made to achieve smooth user operations by displaying guidance in the case where previously stored data such as video and music contents is reproduced using a downloaded application. The communication system 1 includes an application distribution server 80 which distributes a requested application AP via a wireless network 90 such as the Internet, and a cellular phone 10.

The cellular phone 10 carried by a user is a communication device which transmits and receives various types of data such an E-mail in which audio and DSP are added into a packet, and displays guidance in the case where the previously stored data such as video and music contents are played back using the downloaded application AP. The cellular phone 10 includes: an antenna ex201 for transmitting and receiving radio waves with a base station; a camera unit ex203 which can capture a still picture and a moving picture including a CCD ex129 and a flash; a body part made up of a set of operation keys ex204; a speech output unit ex208 for outputting music and communication speech and made up of a speaker and the like; a speech input unit ex205 for inputting a speech and made up of a microphone and the like; a slot unit ex206 for allowing a recording medium ex207 such as SD card to be installed; and a display unit ex202 for displaying a still picture captured by the camera unit ex203, a still picture received via the antenna ex201 and the like and made up of a LCD and the like.

Note that, a touch panel is attached on a surface of the display unit ex202. Also, the cellular phone 10 includes a storage unit 16 in the body, and automatically stores the downloaded application AP into an "application" holder set in the storage unit 16 and the captured still picture, moving picture and the like into "group 1", "group 2" and . . . folders set in the storage unit 16.

Figure 4:
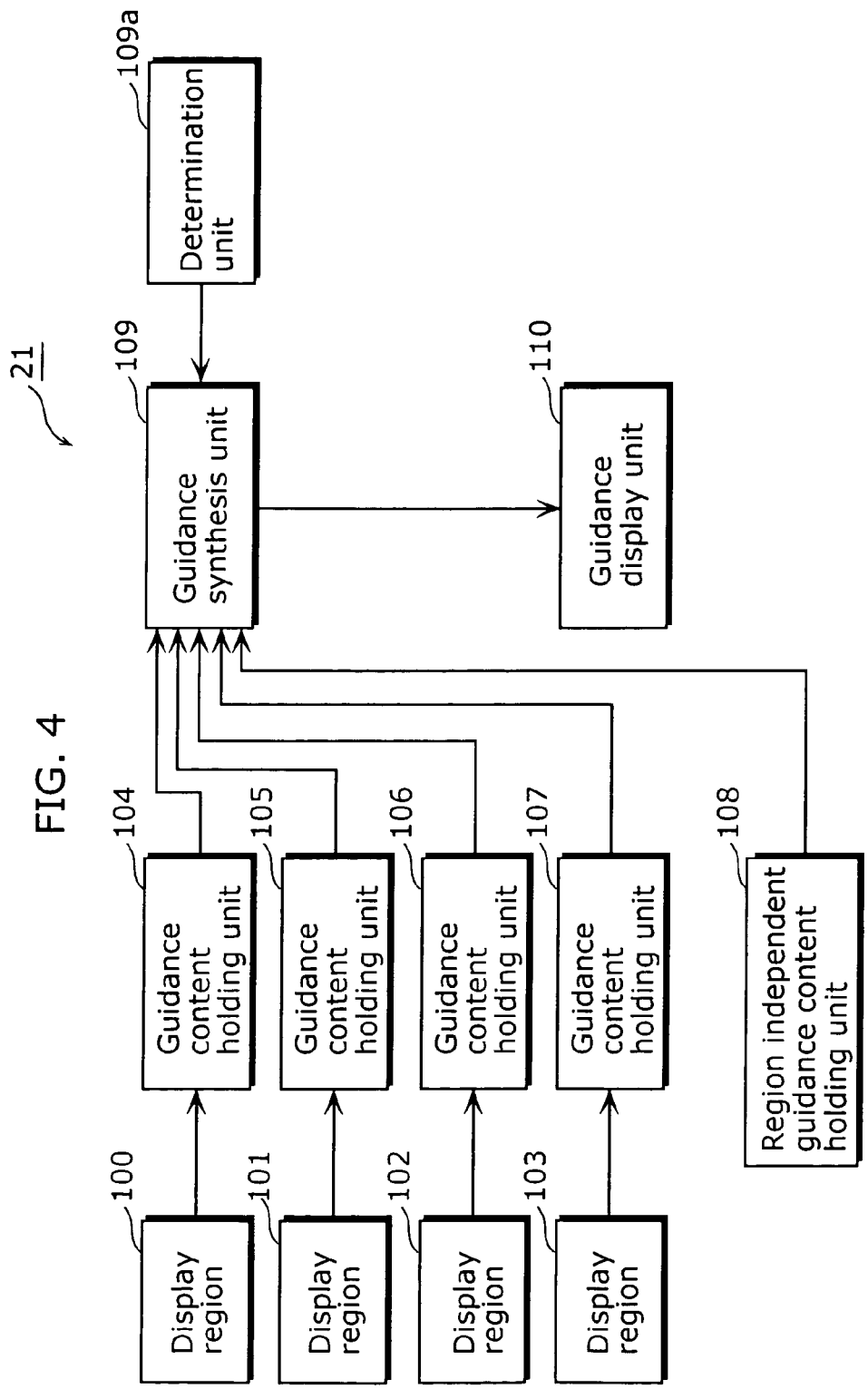
FIG. 4 is a diagram showing a structure of the guidance display device according to the first embodiment of the present invention.

FIG. 4 is a block diagram showing a functional structure of the guidance display device included in the cellular phone 10 shown in FIG. 3. It should be noted that components included in the guidance display device are realized by the downloaded application AP, a CPU which executes the application AP, a memory and the like. Furthermore, a portion of or all of the constituents of the guidance display device may be structured as an integrated LSI.

As shown in FIG. 4, the guidance display device 21 includes guidance contents holding units 104 to 107 respectively corresponding to the display regions 100 to 103, a region independent guidance content holding unit 108, a guidance synthesis unit 109, a determination unit 109a, and a guidance display unit 110.

Figure 1B:
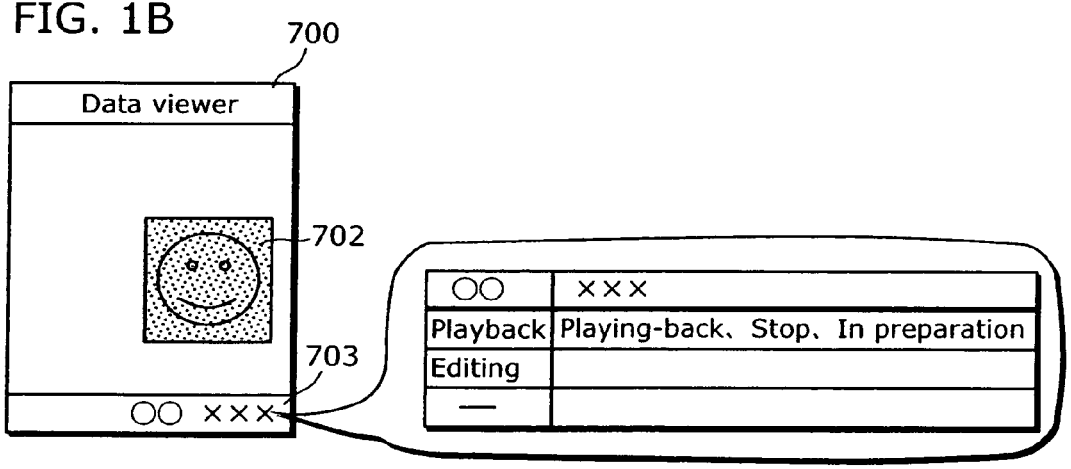
Figure 1C:
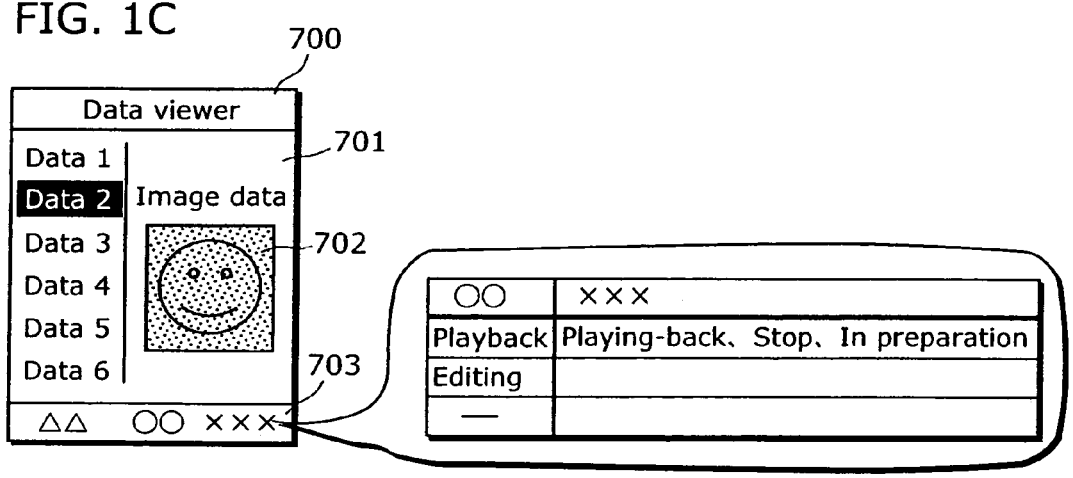
Figure 2:
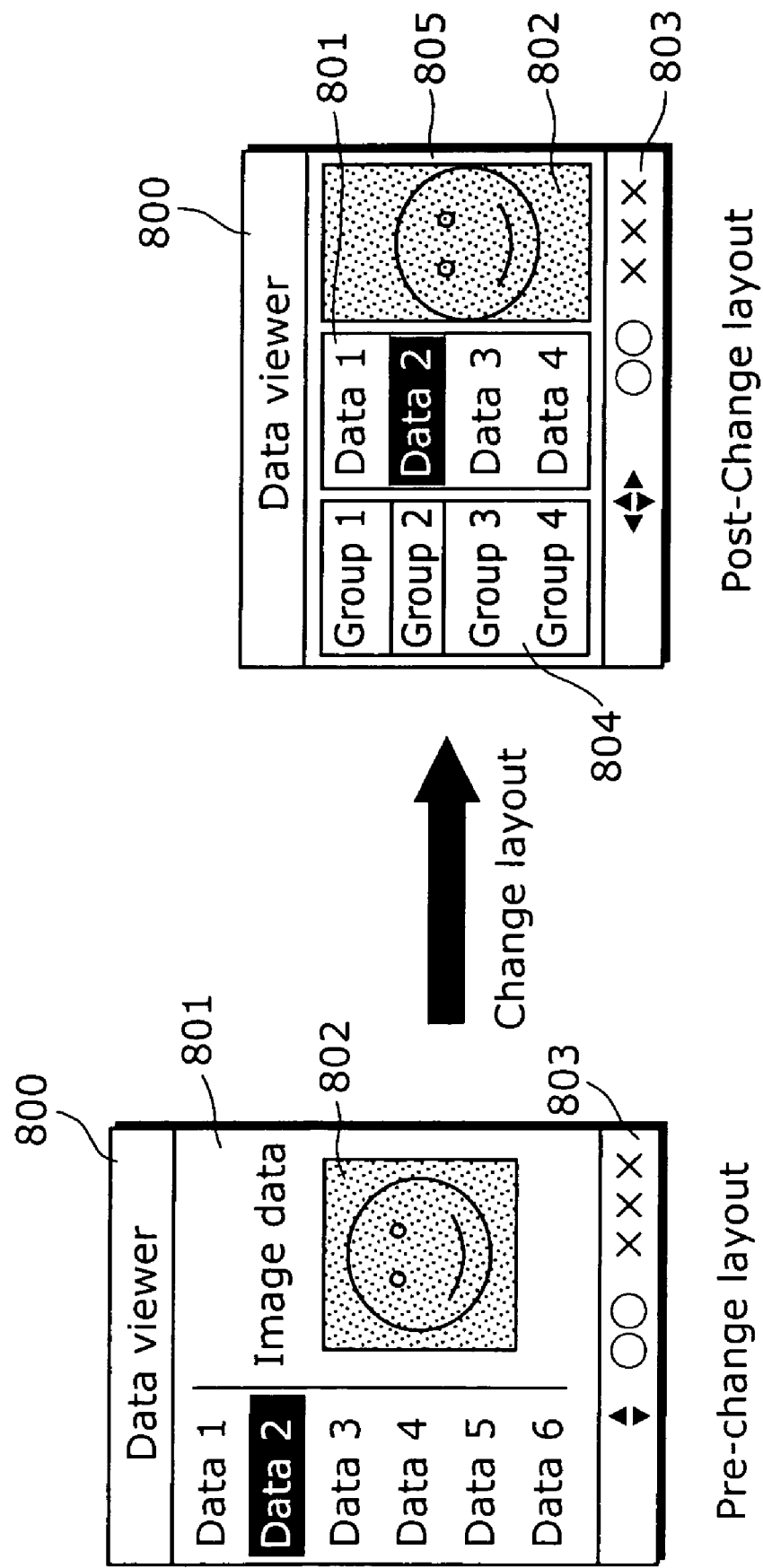
FIG. 2 is a diagram showing an example of a layout change of the screen display.

In FIG. 4, the display regions 100 to 103 are display regions which constitute a screen shown in FIG. 3. Here shows an example of one screen made up of four display regions. They are also applied to the display regions 700 to 703 shown in FIG. 1 and display regions 800 to 805 shown in FIG. 2. In other words, the display regions to be operated by the user are the display region 101 and the display region 102. While the display region is rectangular in shape in this example, the shape is not necessarily to be rectangular but it can be an arbitrary shape such as an ellipse and a polygon. The display regions 100 to 103 may be realized, for example, as a widget which is a GUI component and as a window.

The guidance content holding units 104 to 107 correspond respectively to the display regions 100 to 103, hold guidance contents relating to the respective display regions, and are realized using an information storage device such as a memory. In the first embodiment, it is explained about an example in which the guidance content holding units 104 to 107 correspond respectively to the display regions 100 to 103. However, their correspondence is not only limited to one-toone correspondence, but also to many-to-one correspondence or many-to-many correspondence. Furthermore, all display regions on the screen do not necessarily correspond to guidance content holding units. A display region in which guidance is not necessary to be displayed does not need to correspond to a guidance content holding unit. For example, the display region shown in FIG. 3 is a guidance display region itself in which the guidance display contents are determined based on the guidance contents of other display regions (101 and 102) so that it can be determined that the guidance contents of the display region 103 do not exist.

FIG. 5 is a diagram showing an example of guidance contents stored in the guidance content holding unit. Note that, since the display region 101 and the display region 102 are operated by the user in the example shown in FIG. 3, FIG. 5 shows an example of guidance contents respectively stored in the guidance content holding units 101 and 102.

As shown in FIG. 5, a display state of display and no-display and a display content, for each item displayed as guidance, are stored as guidance contents.

In the example shown in FIG. 5, the items displayed as guidance are upward, downward, rightward and leftward arrows, a soft key, a state display of an application, and an operation description, and a display state, and a display content are stored for each item.

Specifically, the following is stored in the display region 101: a display state "display" and a display content "/" for the item "upward arrow"; a display state "-" and the display content "/" for the item "rightward arrow": the display state "display" and the display content "/" for the item "downward arrow"; the display state "-" and the display content "/" for the item "leftward arrow"; the display state "-" and the display content "-" for the item "soft key"; the display state "-" and the display content "-" for the item "state display"; and the display state "-" and the display content "-" for the item "operation guide".

Also, the following is stored in the display region 102: the display state "-" and the display content "/" for the item "upward arrow"; the display state "-" and the display content "/" for the item "rightward arrow": the display state "-" and the display content "/" for the item "downward arrow"; the display sate "-" and the display content "/" for the item "leftward arrow"; the display state "display" and the display content "playback" for the item "soft key"; the display state "display" and the display content "stop" for the item "state display"; and the display state "-" and the display content "-" for the item "operation guide".

Here, "/" in the diagram indicates that a setting is unnecessary and "-" indicates that a setting has not been made. Also, with respect to the guidance contents for the display regions 101 and 102 shown in the diagram, the downloaded application searches for data to be processed, previously obtains, for each piece of data to be processed, as data for guidance required for the user when the data is processed, and holds the obtained data.

It should be noted that such guidance contents do not need to hold information relating to all items. As shown in FIG. 5, for the unintended guidance items, information such as display state and display content may be kept as "-" indicating that a setting has not been made.

While the present example explains the case where the number and types of the items are standardized, the number and types of items may vary for each guidance content holding unit or the number and types of items may be dynamically changeable. Also, while the display state and the display content are separately managed, they may be unified as one attribute and may be indicated as display in the case where the display content has been set and as no-display in the case where the display content has not been set. Further, information other than the display state and display content may be added. Furthermore, in the case where the display content is fixed so that the setting is unnecessary, the display content part may be omitted as shown in the upward arrow item in FIG. 5. Additionally, the items on this list are not necessarily to be displayed all the time on the guidance so that items that are not displayed on the actual guidance may be included. While the display contents are indicated as character strings in FIG. 5, they may be an ID which indicates such as image data, moving picture data and sound data.

The region independent guidance content holding unit 108 is a portion in which the guidance contents which do not correspond to the display regions are stored and is used for holding contents of guidance that do not relate to the display regions now on display such as guidance on a previous screen, a communication state and a sound volume relation. In other words, the region independent guidance content holding unit 108 holds guidance contents that are independent from the display regions 100 to 103, such as a remaining amount of battery and an item of within communication distance/outside communication distance. Since the guidance contents stored in the region independent guidance content holding unit 108 are same as those stored in the guidance content holding units 104 to 107 in which the example is provided in FIG. 5, the same explanations are omitted here. Note that, while it is explained about an example of the case of one region independent guidance content holding unit, there may be plural region independent guidance content holding units or no region independent guidance holding unit.

The guidance synthesis unit 109 obtains guidance contents in a predetermined order from the guidance content holding units 104 to 107 and the region independent guidance content holding unit 108, synthesizes the obtained contents, and notifies the guidance display unit 110 of the synthesis result.

In the case where the guidance synthesis unit 109 synthesizes the guidance contents, the determination unit 109a determines a next display region from which guidance information is obtained from among the display regions to be operated by the user, using one of the following methods 1 to 3.

1. The determination unit 109a determines a display region from which guidance is obtained based on operation states such as a focus of the display region to be operated by the user and a position of a mouse pointer.

2. The determination unit 109a determines a display region from which guidance is obtained based on an event transmission order.

3. A display region from which guidance is obtained is determined based on an arrangement relation (parenthood or coordinates) of the display regions.

The guidance display unit 110 displays the guidance contents on the screen based on the synthesis result notified from the guidance synthesis unit 109.

Next, it is explained about operations of synthesis processing performed by the guidance synthesis unit 109.

FIG. 6 is a flowchart showing the operations of synthesis processing performed by the guidance synthesis unit 109.

The guidance synthesis unit 109 starts processing in the case where an event occurs so that guidance display and update are necessary to be performed, for example, when an initial screen is displayed, when a screen is transited, when a content stored in each guidance content holding unit (104 to 107) is changed, when an operation state such as a focus position and a cursor/a mouse pointer is changed by an operation of the user (S201). Here, the guidance synthesis unit 109 itself may start synthesizing the guidance contents by monitoring such aforementioned states, or may include a processing unit of monitoring the aforementioned states and notify changes in the states of the guidance synthesis unit 109. Note that, it is assumed herein that the guidance synthesis unit 109 monitors the states. The case of setting a block for monitoring the states is explained in the second embodiment so that the detailed explanation is omitted here.

The guidance synthesis unit 109 determines from which one of the guidance content holding units 104 to 107 and the region independent guidance content holding unit 108 a guidance content is firstly obtained (S202). The guidance synthesis unit 109 determines this first holding unit based on the operation states. For example, in the case where a focus position is used as an operation state, the guidance synthesis unit 109 determines a display region having the focus, and determines a guidance content holding unit corresponding to the display region as the first guidance content obtainment location. Also, a position of a mouse pointer, a cursor and the like may be used as the operation state other than the focus position. For example, in the case where the display region is a region such as a window and a widget which can receive an event, a display region to which an event is sent at first may be determined as the first guidance content obtainment location. Note that, while the first obtainment location is determined in accordance with the operation state in the aforementioned example, the following method may be also used: a method of starting obtaining guidance contents, for example, from the guidance content holding unit corresponding to the display region placed foremost in the display using the arrangement relation of the display regions; a method of attaching a priority to each guidance content holding unit and obtaining guidance contents from the guidance content holding unit with the higher priority; a method of starting obtaining guidance contents from the position instructed by an application and the like; and a method of starting obtaining from the guidance content holding unit in which the held contents are changed. Furthermore, the region independent guidance content holding unit 108 may be determined as the first obtainment location in place of one of the guidance content holding units.

Next, the guidance synthesis unit 109 obtains guidance contents from the guidance content holding unit determined as the obtainment location (S203) in Step S202 for the first time and in Step S206 from the second time and after. The guidance synthesis unit 109 then synthesizes the guidance content obtained in Step S203 with the synthesis result of the previously obtained guidance contents (S204). In the case of the first synthesis, there is no synthesis result of the previously obtained guidance contents so that the currently obtained guidance content is determined as the synthesis result of this time.

FIG. 7 shows an example of guidance synthesis processing. In this example, there are seven items to be displayed as guidance and display contents of the respective items, and they are determined through synthesis processing. In this case, the display state and display content of each item in the previous synthesis result are firstly checked. If the display state and display content have been determined (e.g. the item "soft key" in FIG. 7), the details are determined as the current synthesis result. If the display state and display content are not determined in the previous synthesis result (e.g. the item "operation guide" in FIG. 7), the display state and display content of the currently obtained guidance content are determined as the current synthesis result. It should be noted that, while the previously obtained guidance content synthesis results are prioritized in FIG. 7, the synthesis may be performed preferring the currently obtained guidance content or the priority may be switched for each item. The guidance synthesis unit 109 notifies the guidance display unit 110 of such obtained synthesis result as information to be used for a next synthesis or as determined information so that the obtained synthesis result is stored in a storage device such as a memory. It should be noted that, while a method of performing synthesis every time when the content is obtained is explained in this example, the method may be changed to a method of firstly performing obtainments of contents and then uniformly synthesizing the obtained contents.

The guidance synthesis unit 109 then determines whether or not all guidance contents have been defined (S205). This determination is made depending on whether or not there is an item in which a display state and display content have not been defined in the synthesis result obtained in Step S204. For example, as in the case of the synthesis result shown in FIG. 5, the state display has not been defined so that it is determined that the guidance content has not been defined and the process moves to another obtainment location search (S206). It should be noted that the determination made on whether or not the guidance content has been defined is omitted and a synthesis processing may be performed until the last one of next guidance content obtainment locations.

In the case where all guidance contents are defined (YES in S205), the guidance synthesis unit 109 notifies the guidance display unit 110 of the guidance contents synthesized in Step S204 as the guidance contents (S209). The guidance display unit 110 then displays the notified guidance contents on the screen.

On the other hand, in the case where all of the guidance contents have not been defined (NO in S205), the guidance synthesis unit 109 searches for a next guidance content obtainment location (S206). Here, in the case where there is no appropriate next guidance content obtainment location, the process moves to the next step by determining that there is no obtainment location. Explaining about a method of searching for an obtainment location in the case where a synthesis is performed in order of the event delivery, the method is realized by which the guidance synthesis unit 109 refers information for managing event transmission for transmitting, to one of the display regions, an event transmitted to a display region corresponding to the guidance content holding unit which is a previous obtainment location. This "transmission" indicates to transmit the event again to another display region in the case where the event transmitted at first is not used in the display region. In general, when an event is used for a specific display region, a re-transmission of the event is not performed because it is considered that the event has been processed. Also, in the case where there is a region independent guidance content holding unit 108 which do not correspond to the display region, the region independent guidance content holding unit 108 is determined as the next obtainment location when the next obtainment location is not found after searching from among the guidance content holding units. In the case where the next obtainment location is not found after searching from among both of the guidance content holding units and the region independent guidance content holding unit 108, it is determined that there is no next obtainment location. Also, in the case where there are plural region independent guidance content holding units 108, a synthesis order is determined by attaching a priority and the like to them. It should be noted that the region independent guidance content holding unit 108 may be obtained prioritizing to the guidance content holding unit instead. Further, in the case where the display region is a window, in a general window system, events are sequentially transmitted to a parent window. Therefore, a parent window of a display region corresponding to the guidance content holding unit which is the previous obtainment location may be obtained and the guidance content holding unit corresponding to the obtained parent window may be determined as a next obtainment location. Further, in addition to the method according to the event delivery order, another method of searching for a next guidance content obtainment location may include determining, based on an arrangement relation of display regions, for example, a display region that is placed below the current display region in order as the next obtainment location, determining a display region displayed sequentially from the one displayed just behind the forefront as the next obtainment location, or attaching a priority to the guidance content holding unit and determining the next obtainment location in accordance with the priority.

The guidance synthesis unit 109 determines whether or not there is a next guidance content obtainment location (S207). In the case where there is a next guidance content obtainment location (NO in S207), the guidance synthesis unit 109 returns to Step S203 and obtains guidance contents from the next guidance content obtainment location. On the other hand, in the case where it is determined that there is no next guidance content obtainment location (YES in S207), the guidance synthesis unit 109 defines a portion, from among the guidance contents, which has not been defined (S208). This processing is performed by defining the display state of the undefined portion as no-display. Not only limited to defining the undefined portion as no-display, it should be noted that a setting value of a default may be previously determined and the setting value may be determined as the content. Accordingly, all contents are defined so that the guidance display unit 109 moves to Step S209 and notifies the guidance display unit 110 of the defined guidance contents as display contents.

More specifically, the flow of synthesis processing is described hereinafter.

Figure 8:
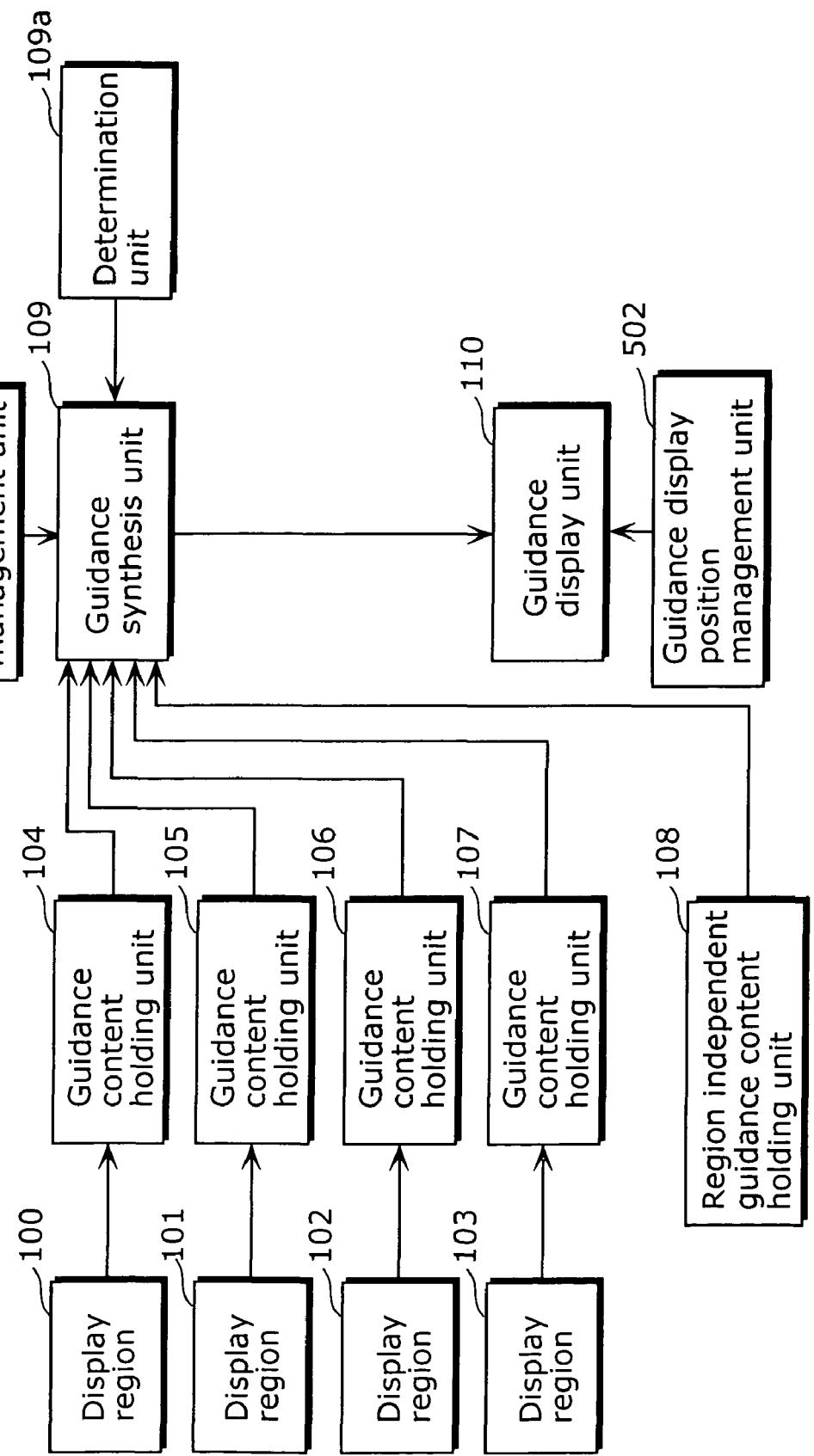
FIG. 8 is a diagram showing a structure of a guidance display device according to a second embodiment of the present invention.

First, a display region 102 displayed in the forefront is determined as the synthesis start position (S202). Next, the guidance contents of the display region 102 are obtained (S203). Since there is no previous synthesis result, the currently obtained guidance contents (the display region 102) are determined as the synthesis result (S204). After that, since the result in Step S205 is NO, the process moves to Step S206 and the next obtainment location is set to the display region 101. The result in Step S207 is NO, the process moves to Step S203 and the guidance contents of the display region 101 are obtained. The obtainment guidance contents are synthesized as shown in FIG. 8 in Step S204.

Next, the process moves to NO in Step S206 and to YES in Step S207. The undefined portions (rightward and leftward arrows, an operation guide) are displayed as no-display in Step S208.

Specifically, in the case where the display states and display contents of "display" and "playback" that have been previously defined are synthesized with those of "-" and "/", the previously defined "display" and "playback" are preferentially selected. The previously obtained synthesis result is preferentially selected in the case where the display states and display contents of the previously obtained synthesis result are contrary to the display states and display contents of the currently obtained contents as in the case of "display" and "no-display".

Consequently, the defined guidance is displayed to the display region 103 shown in FIG. 3.

According to this structure, the guidance synthesis unit 109 synthesizes the guidance contents of respective display regions at the timing of displaying them on the screen. Therefore, the guidance display contents are automatically determined in accordance with operation states such as a layout and a focus position of a display region. As the result, an appropriate guidance display can be realized even in the case where the layout of the screen or the guidance contents corresponding to respective display regions are not clear at the designing level.

Second Embodiment

FIG. 8 is a diagram showing a structure of a guidance display device according to the second embodiment of the present invention. In FIG. 8, the same constituents as shown in FIG. 4 are indicated with same reference numbers and the explanations about the same constituents are omitted herein.

As shown in FIG. 8, the guidance display device 22 further includes an arrangement relation management unit 501 and a guidance display position management unit 502 in addition to the constituents of the guidance display device 21 according to the first embodiment.

Figure 9:
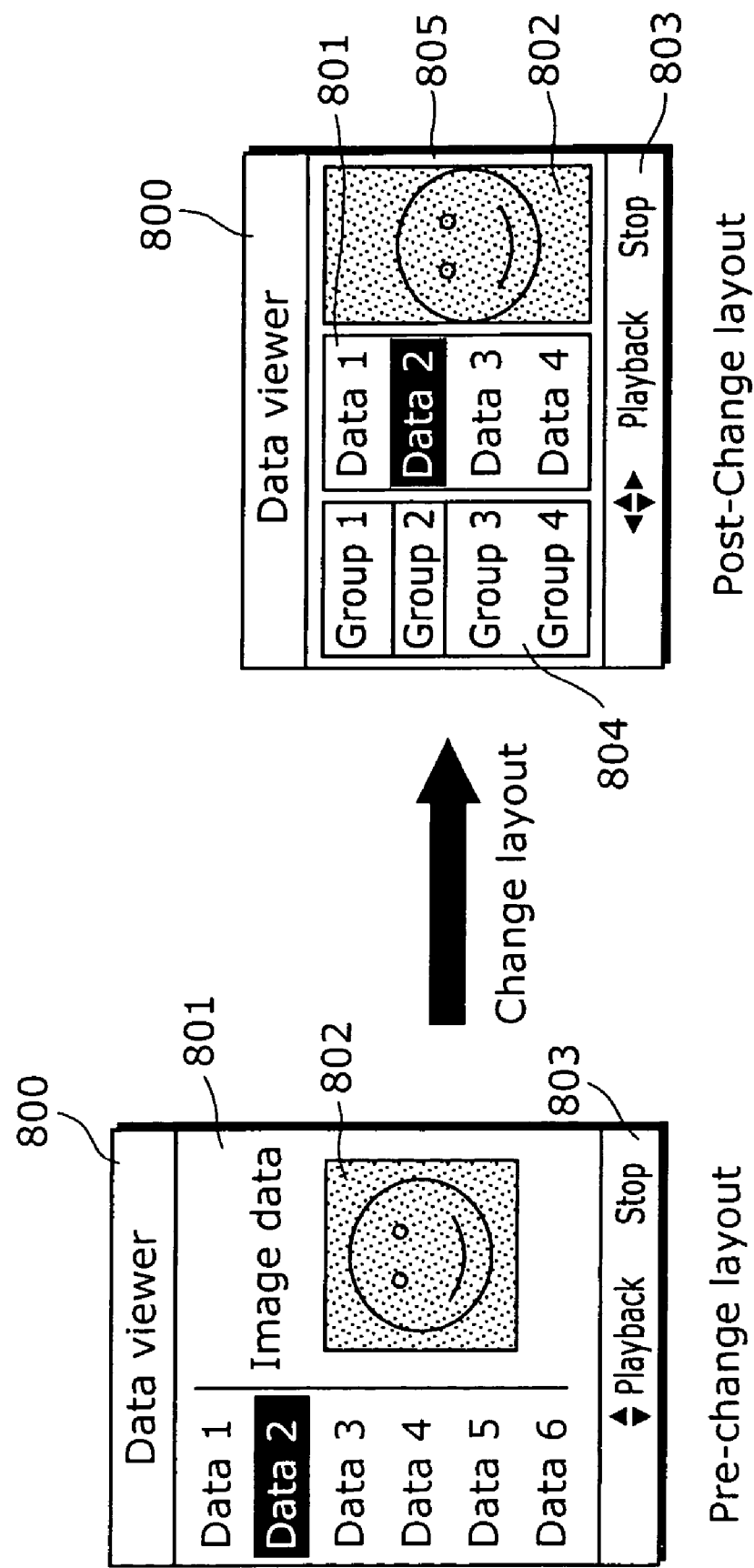
FIG. 9 is a diagram showing a structure of a screen in the case where an arrangement relation such as layout is changed.

The arrangement relation management unit 501 manages an arrangement relation of display regions, and notifies the guidance synthesis unit 109 to start synthesizing guidance contents in the case where there is a change in the arrangement relation such as a layout as shown in FIG. 9. Also, since the arrangement relation management unit 501 manages the arrangement relation of the display regions, in the case where the determination unit 109a performs guidance synthesis processing according to the arrangement relation of the display regions, the determination unit 109a may make an inquiry to the arrangement relation management unit 501 about an obtainment location of the next guidance content in Step S206 in FIG. 6.

Here, with respect to the arrangement relation of the display regions, the display region 802 is included in the display region 801, for example, in the pre-change layout (a vertical display) of the screen shown in FIG. 9. In the post-change layout, the display region 802 and the display region 801 do not have an inclusive relation, and the display regions 802, 803 and 804 are arranged in parallel on the display region 805.

The guidance display position management unit 502 manages a position and a size to and by which each item of the guidance content is to be displayed. The guidance display unit 110 obtains a display layout of each item from the guidance display position management unit 502 in the case of displaying the guidance, and displays the guidance in accordance with the obtainment layout.

FIG. 10 is a diagram showing an example of a structure of the display layout information stored in the guidance display position management unit 502 shown in FIG. 8.

As shown in FIG. 10, the guidance display position management unit 502 holds, as information of the display layout, for each item, a use state showing display/no-display, a display position (initial point coordinates of a rectangular display position on the screen), and a display size (size indicated by width and height). The guidance display unit 110 displays guidance on the screen in accordance with the information of the display layout shown in FIG. 10.

For example, in the case of the upward arrow, an arrow with the size of vertical 10 and horizontal 10 is displayed at a position of rightward 50 and downward 0 from the top left of the display region in which the guidance is to be displayed. It should be noted that unnecessary information may be removed from among the use state, the display position and the display size in FIG. 10. Also other information such as a transparency and an animation speed may be added. Furthermore, the information of the guidance display position management unit 502 may be determined at the system design level or may be set freely in accordance with a designation by an application or a user.

Next, the arrangement relation of the display regions in the case where the layout is changed is explained as shown in FIG. 9. It should be noted that the arrangement relation before the layout change is same as shown in FIG. 3, the arrangement relation after the layout change shall be explained.

In the example of the post-change layout shown in FIG. 9, the guidance for the user is displayed to the display regions 801, 802, 804 and 805. The guidance contents of respective display regions are shown in FIG. 11.

FIG. 11 is a diagram showing an example of the guidance contents stored in the guidance content holding units. It should be noted that, since the display regions 801, 802, 804 and 805 are operated by the user in the example of the post-change layout shown in FIG. 9, FIG. 11 shows the example of the guidance contents respectively stored in the corresponding guidance content holding units.

In the case of the example of FIG. 11, there are, as items displayed as guidance, upward, downward, rightward, and leftward arrows, a soft key, a state display of an application and an operation description. A display state and a display content are stored for each item.

Specifically, the following is respectively stored in the display regions 801 and 804: a display state "display" and a display content "/" for the item "upward arrow"; a display state "-" and a display content "/" for the item "rightward arrow"; a display state "display" and a display content "/" for the item "downward arrow"; a display state "-" and a display content "/" for the item "leftward arrow"; a display state "-" and a display content "-" for the item "soft key"; a display state "-" and a display content "-" for the item "state display"; and a display state "-" and a display content "-" for the item "operation guide".

Further, the following is stored in the display region 802: a display state "-" and a display content "/" for the item "upward arrow"; a display state "-" and a display content "/" for the item "rightward arrow"; a display state "-" and a display content "/" for the item "downward arrow"; a display state "-" and a display content "/" for the item "leftward arrow"; a display state "display" and a display content "display" for the item "soft key"; a display state "display" and a display content "stop" for the item "state display"; and a display state "-" and a display content "-" for the item "operation guide".

Furthermore, the following is stored in the display region 805: a display state "-" and a display content "/" for the item "upward arrow"; a display state "display" and a display content "/" for the item "rightward arrow"; a display state "-" and a display content "/" for the item "downward arrow"; a display state "-" and a display content "/" for the item "leftward arrow"; a display state "-" and a display content "-" for the item "soft key"; a display state "-" and a display content "-" for the item "state display"; and a display state "-" and a display content "-" for the item "operation guide".

Next, the operations of the synthesis processing are explained. First, it shall be explained about the case where the display region 802 is to be operated.

First, the display region 802 placed foremost in display is determined as the synthesis start position (S202). The guidance contents for the determined display region 802 are then obtained (S203). In this case, since there is no previously obtained synthesis result, the currently obtained contents for the display region 802 are determined as the synthesis result (S204). Therefore, the process moves to NO in Step S205 and then to Step S206. The display region 805 is then determined as a next obtainment location (S206). After that, since the result in Step S207 is NO, the guidance contents for the display region 805 are obtained (S203) and the obtained contents are synthesized as shown in FIG. 12 (S204).

The process then moves to NO in S205 and YES in S207, and undefined portions (upward and downward arrows and the operation guide) are displayed as "no-display".

The following explains about the case where the display region 804 is to be operated.

In this case, the determination unit 109a firstly determines the forefront display region 804 as the synthesis start position (S202). The guidance contents for the determined display region 804 are then obtained (S203). In Step S204, since there is no previously obtained synthesis result, the guidance synthesis unit 109 determines the obtainment contents for the display region 804 as the synthesis result. The process then moves NO in S205 and the determination unit 109a determines the display region 805 as the next obtainment location (S) 206. The process then moves to SNO. The guidance synthesis unit 109 obtains the guidance contents for the display region 805 (S203). The guidance synthesis unit 109 then synthesizes the obtained guidance contents as shown in FIG. 13 (S204). After that, the process moves to NO in Step S206 and to YES in Step 207. The undefined portions of items (the soft key, the state display and the operation guide) are displayed as no-display in Step S208.

It should be noted that the same explanation is applied to the case of the display region 801 to be operated. In this case, the display region 804 may be changed to the display region 801.

According to the aforementioned structure, in the case where the arrangement relation management unit 501 changes the layout of display regions, the guidance contents are automatically re-synthesized so that the guidance contents can be automatically changed to the appropriate guidance contents. Furthermore, in that case, respective items can be displayed in accordance with the guidance display size and position in the post-changed layout without changing the guidance contents stored in the guidance display content holding unit, by changing the display layout information of the guidance display position management unit 502.

Note that, while it is explained about the case where the layout is changed from vertical to horizontal, even in the case where, for example, the display device is rotated to 180 degrees and folded, the conventional soft key is not allowed for use so that guidance indicating a change to a soft key on the newly assigned main unit side may be displayed.

The guidance display device according to the present invention has guidance content synthesis function of plural regions and is useful for a cellular phone which displays an operation guidance, key guidance and the like in a region on a screen, a portable mobile device and the like. Also, it can be applied for use such as a menu display and the like for operating plural applications. Furthermore, it is appropriate for displaying guidance in various home electric appliances, information processing device, an industrial appliance and the like.

The invention claimed is:

1. A guidance display device which holds a first display region and a second display region, and a guidance display region for displaying a guidance content, the guidance display device comprising:
   a first guidance display unit configured to display first display data in the first display region;
   a second guidance display unit configured to display second display data in the second display region; and a third guidance display unit configured to display, in the guidance display region, a synthesized or combined guidance content which is synthesized or combined from a first guidance content for operating the first display data currently being displayed in the first display region and a second guidance content for operating the second display data currently being displayed in the second display region, wherein the guidance display region is separate from the first and second display regions, and said third guidance display unit is configured to display the synthesized or combined guidance content in the guidance display region when the first and second display data are being displayed.

2. The guidance display device according to claim 1, further comprising:

a guidance contents holding unit configured to hold the first guidance and the second guidance contents, wherein said third guidance display unit is configured to synthesize, into the synthesized guidance, the first guidance content and the second guidance content which have been obtained from said guidance contents holding unit according to an obtainment order indicating an order of obtaining the first guidance content and the second guidance content.

3. The guidance display device according to claim 2, further comprising:

a determination unit; and a third display region including the first and the second display regions, wherein said guidance contents holding unit is further configured to hold a third guidance content that is a guidance for operating the first and the second display data, the third guidance content corresponding to the third display region, said determination unit is configured to determine whether or not the first or the second display data is to be operated, and said third guidance display unit is configured to display, in the guidance display region, a guidance synthesized from the first guidance content and the third guidance content when said determination unit determines that the first display data is to be operated.

4. The guidance display device according to claim 3, wherein, in the case of change in a facing direction of said guidance display device, said guidance display device changes an arrangement of at least one of the first display region, the second display region, and the guidance display region, and to display, in the guidance display region, the synthesized guidance content obtained by combining plural guidance contents corresponding to the first and the second display regions which are rearranged as a result of the change in the arrangement.

5. The guidance display device according to claim 4, wherein the change in the facing direction is turning said guidance display device or folding said guidance display device.

6. The guidance display device according to claim 5, wherein turning said guidance display device is turning said guidance display device approximately 180 degrees.

7. A guidance display method for use in a guidance display device which holds a first display region and a second display region, and a guidance display region for displaying a guidance, the guidance display method comprising:

displaying first display data in the first display region;

displaying second display data in the second display region; and displaying, in the guidance display region, a synthesized or combined guidance content which is synthesized or combined from a first guidance content for operating the first display data currently being displayed in the first display region and a second guidance content for operating the second display data currently being displayed in the second display region, wherein the guidance display region is separate from the first and second display regions, and the synthesized or combined guidance content is displayed in the guidance display region when the first and second display data are being displayed.

* * * * *